(12) United States Patent
Yoshikawa

(10) Patent No.: US 10,302,988 B2
(45) Date of Patent: May 28, 2019

(54) DISPLAY APPARATUS

(71) Applicant: Sakai Display Products Corporation, Sakai-shi, Osaka (JP)

(72) Inventor: Takahiro Yoshikawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/306,211

(22) PCT Filed: May 20, 2014

(86) PCT No.: PCT/JP2014/063353
§ 371 (c)(1),
(2) Date: Oct. 24, 2016

(87) PCT Pub. No.: WO2015/177866
PCT Pub. Date: Nov. 26, 2015

(65) Prior Publication Data
US 2017/0045774 A1    Feb. 16, 2017

(51) Int. Cl.
*G02F 1/1333*    (2006.01)
*G02F 1/1335*    (2006.01)

(52) U.S. Cl.
CPC ...... *G02F 1/133512* (2013.01); *G02F 1/1333* (2013.01); *G02F 1/1335* (2013.01);
(Continued)

(58) Field of Classification Search
CPC .............. G02F 1/133512; G02F 2001/133317
See application file for complete search history.

(56) References Cited

U.S. PATENT DOCUMENTS

2011/0134355 A1* 6/2011 Yi ................... G02F 1/133512
349/58
2011/0157519 A1 6/2011 Yusa
(Continued)

FOREIGN PATENT DOCUMENTS

CN    102128387 A    7/2011
CN    102606963 A    7/2012
(Continued)

*Primary Examiner* — Anh T Mai
*Assistant Examiner* — Zachary J Snyder
(74) *Attorney, Agent, or Firm* — Rudy J. Ng; Bret E. Field; Bozicevic, Field & Francis LLP

(57) ABSTRACT

The display apparatus includes an optical sheet provided between a display panel and direct type light sources, and an inner chassis (support body) 4 having a frame-shape which supports the back surface of peripheral edge parts of the display panel. A light shielding member is provided over an entire periphery of the display panel at the back side of the peripheral edge part thereof. An outer frame part of the light shielding member is sandwiched between the display panel and the inner chassis, and an inner frame part of the light shielding member is sandwiched between the display panel and the optical sheet. Light passing through the optical sheet is shielded by the light shielding member even when trying to be leaked to an outside from the polarizing plate, such that the light is not leaked due to being shielded by the light shielding member. Therefore, the light is prevented from entering the peripheral edge part of the display panel, and an occurrence of light leakage is prevented.

8 Claims, 6 Drawing Sheets

(52) U.S. Cl.
CPC .. *G02F 1/133308* (2013.01); *G02F 1/133528* (2013.01); *G02F 1/133602* (2013.01); *G02F 1/133605* (2013.01); *G02F 1/133606* (2013.01); *G02F 2001/133317* (2013.01)

(56) References Cited

U.S. PATENT DOCUMENTS

| | | | |
|---|---|---|---|
| 2015/0055316 A1* | 2/2015 | Ye | G02B 7/00 361/809 |
| 2015/0301272 A1* | 10/2015 | Chang | G02B 6/00 349/58 |
| 2016/0363718 A1* | 12/2016 | Zhou | G02F 1/133308 |

FOREIGN PATENT DOCUMENTS

| | | |
|---|---|---|
| JP | 2009-265237 A | 11/2009 |
| JP | 2013-171619 A | 9/2013 |

* cited by examiner

DISPLAY APPARATUS

CROSS-REFERENCE TO RELATED APPLICATIONS

This application is the national phase under 35 U.S.C. § 371 of PCT International Application No. PCT/JP2014/063353 which has an International filing date of May 20, 2014 and designated the United States of America.

FIELD

The present invention relates to a display apparatus which displays an image using a direct type backlight.

BACKGROUND

A display apparatus which displays an image using a non-luminescent type display panel such as a liquid crystal panel includes a backlight for illuminating the display panel from behind. As the backlight, there are a direct type backlight in which light sources are disposed behind the display panel, and an edge light type backlight in which a light guide plate is disposed behind the display panel, and light sources are disposed to face an end face of the light guide plate.

Light from the backlight enters a back surface of the display panel, and is emitted from a display surface which displays the image. However, a part of the light from the backlight may enter the end face of the display panel. In this case, the light enters the end face of the display panel is emitted from a peripheral edge portion of the display surface, such that light leakage, in which the peripheral edge portion of the display surface becomes brighter than the other portion of the display surface, occurs. When the light leakage occurs, a quality of the displayed image is deteriorated. In particular, in a display apparatus whose frame is narrowed, the light leakage may easily occur. Japanese Patent Laid-open Publication No. 2013-171619 discloses a technique of preventing light leakage by including a light shielding member in contact with an end face of the display panel.

SUMMARY

The technique disclosed in Japanese Patent Laid-open Publication No. 2013-171619 prevents the light leakage by being in contact with the light shielding member to the end face of the display panel, however, when a position of the light shielding member is shifted due to variations in assembling, or the like, the light leakage occurs. In addition, the display panel has a structure in which a glass panel part including a plurality of glass substrates is sandwiched by two polarizing plates, and the glass panel part is larger than the polarizing plates. On a back surface of the peripheral edge portion of the display panel, a portion of the glass panel part is exposed without being covered with the polarizing plates. When light enters the portion in which the glass panel part is exposed, the light leakage similarly occurs.

In consideration of the above-mentioned circumstances, it is an object to provide a display apparatus which includes a direct type backlight and is capable of reliably preventing a light leakage.

A display apparatus according to one embodiment of the present disclosure comprises: a display panel in which light enters a back surface to display an image on a front surface; light sources which are provided at a back side of the display panel and irradiate the display panel with light; an optical sheet which is provided between the display panel and the light sources and is configured to pass the light from the light sources therethrough; and a support body having a frame-shape which supports peripheral edge parts of the display panel and the optical sheet from a back side of the peripheral edge parts. The display apparatus is characterized by comprising: a light shielding member having a frame-shape which is provided over an entire periphery of the display panel at the back side of the peripheral edge part of the display panel, wherein the light shielding member has an outer frame part which is sandwiched between the display panel and the support body, and an inner frame part which is formed continuous to an inside of the outer frame part, and is sandwiched between the display panel and the optical sheet.

According to the embodiment of the present disclosure, the display apparatus includes the optical sheet which is provided between the display panel and the direct type light sources, and the support body having a frame-shape which supports the back surface of the peripheral edge part of the display panel. The light shielding member is provided over the entire periphery of the display panel at the back side of the peripheral edge part thereof. The outer frame part of the light shielding member is sandwiched between the display panel and the support body, and the inner frame part of the light shielding member is sandwiched between the display panel and the optical sheet. The light passing through the optical sheet is shielded by the light shielding member, such that the light is prevented from entering the peripheral edge part of the display panel.

The display apparatus according to the embodiment of the present disclosure is characterized in that the display panel includes a glass panel part and a polarizing plate provided at a back side of the glass panel part, the glass panel part is larger than the polarizing plate, the outer frame part is in contact with a portion of the glass panel part which protrudes from an end of the polarizing plate in a direction along the display panel, and the inner frame part is in contact with a back surface of the polarizing plate.

According to the embodiment of the present disclosure, the glass panel part of the display panel is larger than the polarizing plate provided at the back side of the glass panel part. A peripheral edge part of the glass panel part protrudes from the end of the polarizing plate and a back surface thereof is exposed without being covered with the polarizing plate. The outer frame part of the light shielding member is in contact with the back surface of the peripheral edge part of the glass panel part, and the inner frame part is in contact with the back surface of the polarizing plate. The light passing through the optical sheet is shielded by the light shielding member, and the light is prevented from entering a portion of the glass panel part which is exposed without being covered with the polarizing plate.

The display apparatus according to the embodiment of the present disclosure is characterized in that the light shielding member has a stepped shape in which a position of the inner frame part shifts from a position of the outer frame part toward a back side.

According to the embodiment of the present disclosure, the light shielding member is formed in the stepped shape in which the position of the inner frame part shifts from the position of the outer frame part toward a back side. The light shielding member has a high adhesiveness with the display panel, the support body and the optical sheet, and a positional shift of the light shielding member is prevented.

The display apparatus according to the embodiment of the present disclosure is characterized in that the light shielding member has elasticity.

According to the embodiment of the present disclosure, since the light shielding member has elasticity, a restoring force is generated therein by being pressed between the display panel, the support body and the optical sheet, and the light shielding member abuts so as to come into close contact with the peripheral edge parts of the display panel and the optical sheet. Therefore, the light passing through the optical sheet is reliably prevented from entering the peripheral edge part of the display panel.

The display apparatus according to the embodiment of the present disclosure is characterized in that the light shielding member is adhered to the peripheral edge part of the display panel or to the support body.

According to the embodiment of the present disclosure, the light shielding member is adhered to the peripheral edge part of the display panel or the support body, such that a positional shift of the light shielding member during assembling the display apparatus is prevented.

The display apparatus according to the embodiment of the present disclosure is characterized in that, in the light shielding member, the outer frame part is adhered to the support body, and the inner frame part is thinner than the outer frame part.

According to the embodiment of the present disclosure, the outer frame part of the light shielding member is adhered to the support body, and the inner frame part of the light shielding member is thinner than the outer frame part. When assembling the display apparatus, during disposing the optical sheet on the support body, the inner frame part of the light shielding member is pressed by the optical sheet to be bent, but returns to an original shape by a restoring force thereof, and the inner frame part of the light shielding member is not inserted behind the optical sheet.

The display apparatus according to the embodiment of the present disclosure is characterized in that the optical sheet is provided at an inside of the support body, and the support body has a portion which shields light and supports the optical sheet by contact with the back surface of the peripheral edge part of the optical sheet.

According to the embodiment of the present disclosure, the optical sheet is provided at an inside of the support body, and the support body shields the light and supports the optical sheet from behind. Light which does not enter the optical sheet of the light from the light sources is shielded by the support body, and the light does not enter the peripheral edge part of the display panel.

According to an aspect of the present disclosure, the light is prevented from entering the peripheral edge part of the display panel, and an occurrence of light leakage in the display apparatus is reliably prevented. Accordingly, the aspect of the present disclosure obtains excellent effects such as a prevention of a deterioration in quality of an image displayed by the display apparatus.

The above and further objects and features will more fully be apparent from the following detailed description with accompanying drawings.

DETAILED DESCRIPTION

Hereinafter, embodiments of the present disclosure will be described in detail with reference to the accompanying drawings illustrating embodiments thereof.

Embodiment 1

Figure 1:
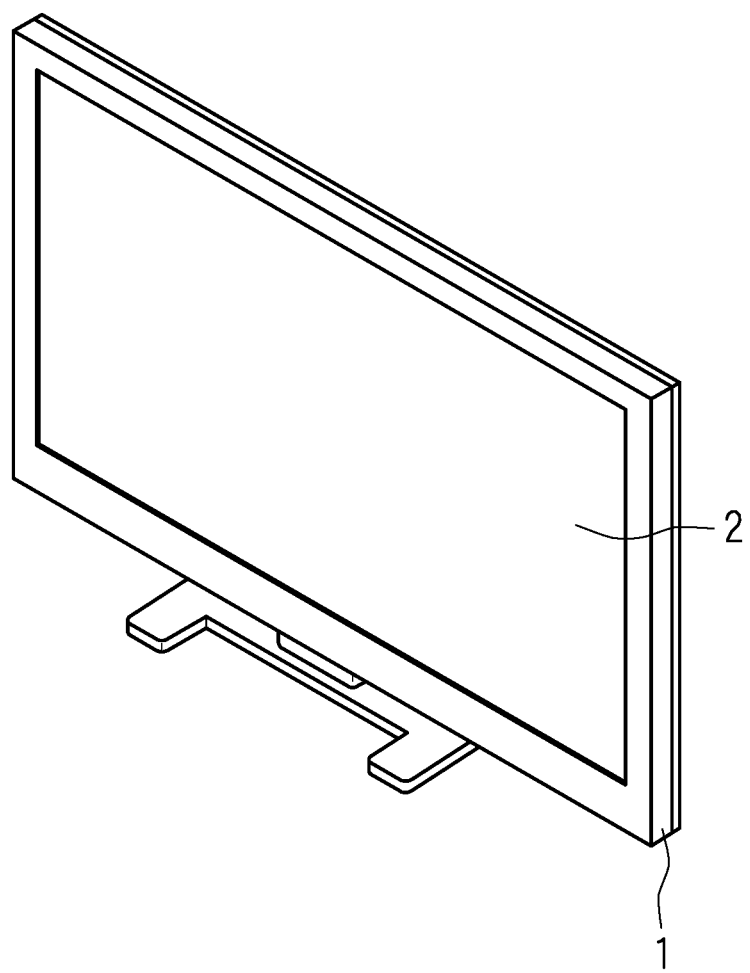
FIG. 1 is a perspective view of a display apparatus according to Embodiment 1.

FIG. 1 is a perspective view of a display apparatus according to Embodiment 1. The display apparatus is, for example, a television receiving apparatus. The display apparatus includes a non-luminescent type display panel 2 of a rectangular plate shape. The display panel 2 is illuminated from behind to display an image thereon. The display panel 2 is, for example, a liquid crystal panel. Peripheral edge portions and side faces of the display panel 2 are covered with a bezel 1. The bezel 1 is a frame-shaped metallic member.

Figure 2:
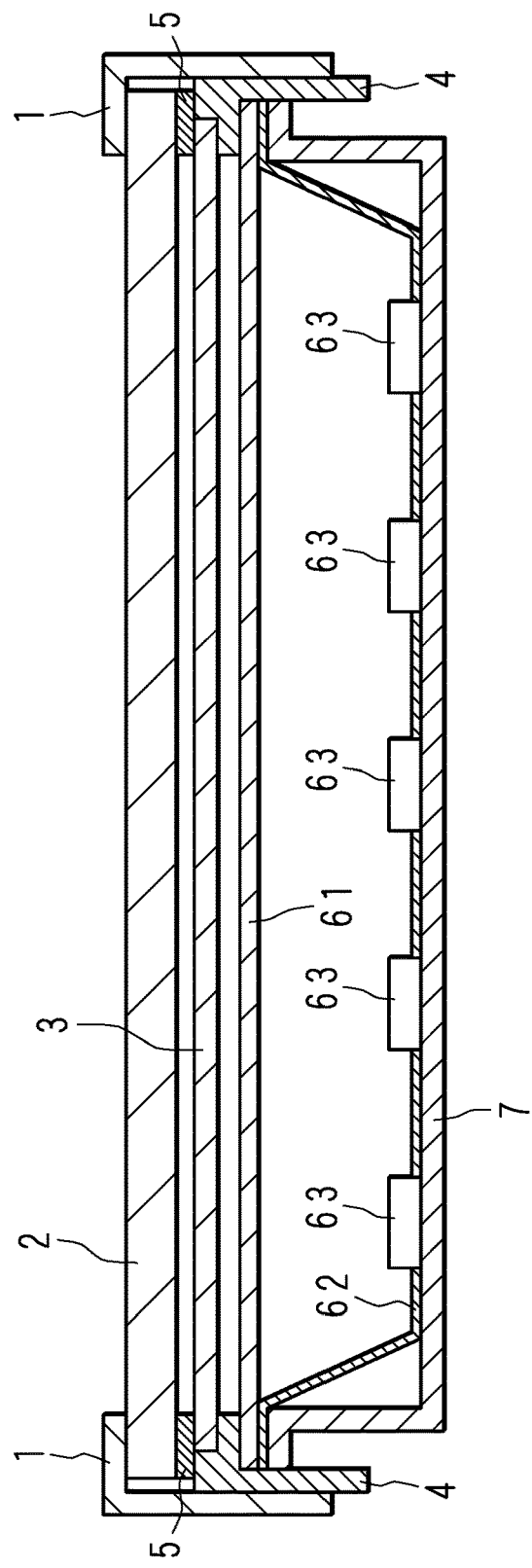
FIG. 2 is a schematic cross-sectional view of the display apparatus.

FIG. 2 is a schematic cross-sectional view of the display apparatus. A left side of FIG. 2 corresponds to a front side of the display panel 2, and a right side thereof corresponds to a back side of the display panel 2. A substantially rectangular optical sheet 3 for diffusing and collecting light is provided behind the display panel 2. The optical sheet 3 is formed by laminating a plurality of sheets such as a sheet having a function to diffuse light, a sheet having a function to collect the light and the like. A back surface of the display panel 2 faces the optical sheet 3. The area of the display panel 2 is larger than that of the optical sheet 3, and the peripheral edge portions of the display panel 2 are provided at an outside from the optical sheet 3 in a front view. A rectangular plate-shaped diffusion plate 61 for diffusing light is provided behind the optical sheet 3. A plurality of light sources 63 are provided behind the diffusion plate 61. The light source 63 includes a light emitting diode, a cold-cathode tube or the like. The plurality of light sources 63 are separated from the diffusion plate 61, and are arranged in a direction along the diffusion plate 61. The light sources 63 face the back surface of the display panel 2 with the optical sheet 3 and the diffusion plate 61 interposed therebetween. Further, a reflection sheet 62 for reflecting the light from the light sources 63 is provided behind the diffusion plate 61. The diffusion plate 61, the reflection sheet 62 and the light sources 63 form a direct type backlight included in the display apparatus. The light from the light sources 63 is reflected by the reflection sheet 62, enters the diffusion plate 61, and passes through the diffusion plate 61 while being diffused by the diffusion plate 61, then enters the optical sheet 3. The light entering the optical sheet 3 passes through the optical sheet 3 while being diffused and collected by the optical sheet 3, and enters the back surface of the display panel 2. The display panel 2 displays an image by emitting the light which enters from a front surface thereof.

An inner chassis 4 (support body) having a rectangular frame-shape is provided between the display panel 2 and the diffusion plate 61, and between the optical sheet 3 and the diffusion plate 61. The inner chassis 4 is located at the back side of the peripheral edge portions of the display panel 2 and the optical sheet 3, and supports the back surface of the peripheral edge portions of the display panel 2 and the optical sheet 3. In addition, the inner chassis 4 is made of a material which blocks light. A light shielding member 5 is provided between the display panel 2 and the inner chassis 4, and between display panel 2 and the optical sheet 3. The light shielding member 5 blocks the light, and serves as a buffer member to fill a gap between the display panel 2 and the inner chassis 4, and between display panel 2 and the optical sheet 3. The display panel 2 is held between a portion of the bezel 1 located on the front side of the display panel 2 and the inner chassis 4.

A metallic backlight chassis 7 is located at a back side of the reflection sheet 62. The diffusion plate 61 and the reflection sheet 62 are held between the inner chassis 4 and the backlight chassis 7. The light sources 63 are fixed to the backlight chassis 7.

Figure 3:
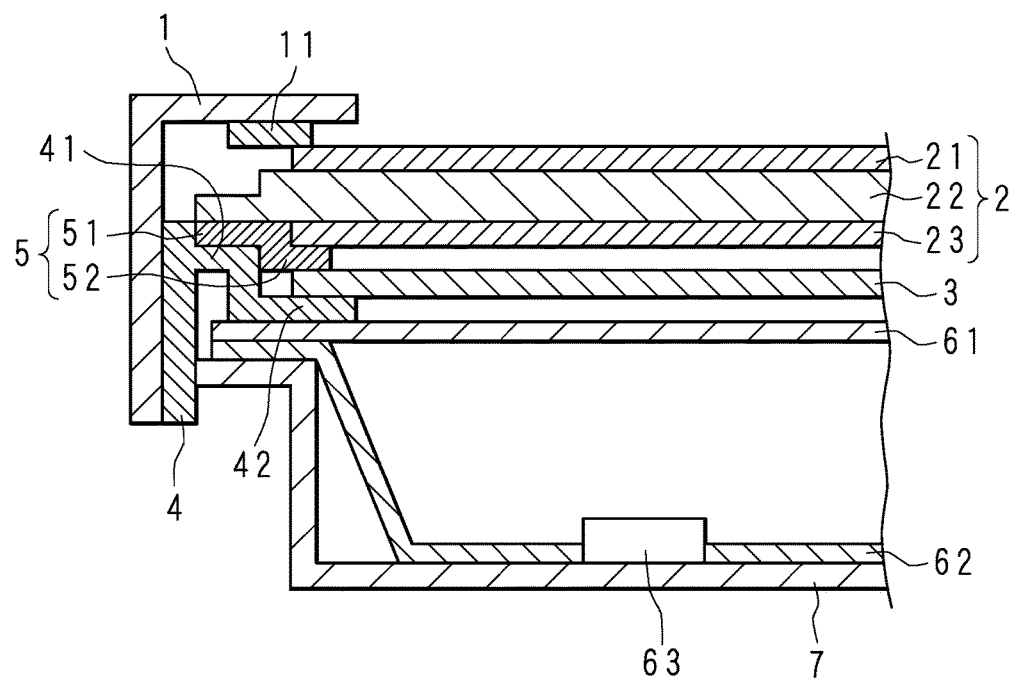
FIG. 3 is a schematic partial cross-sectional view in which an end portion of a cross section of the display apparatus is enlarged.

FIG. 3 is a schematic partial cross-sectional view in which an end portion of a cross section of the display apparatus is enlarged. A spacer 11 is provided between a portion of the bezel 1 located on the front side of the display panel 2 and the display panel 2. The display panel 2 includes a glass panel part 22 in which a plurality of glass substrates are laminated, a polarizing plate 21 provided at the front side of the glass panel part 22, and a polarizing plate 23 provided at the back side of the glass panel part 22. The glass panel part 22 includes an electrode layer mounted on the glass substrate, a liquid crystal layer, and the like. The glass panel part 22 is larger than the polarizing plate 23. Therefore, the peripheral edge part of the glass panel part 22 protrudes from an end of the polarizing plate 23 in a direction along the display panel 2, and a back surface of the peripheral edge part is exposed without being covered with the polarizing plate 23.

The inner chassis 4 has a panel support part 41 which supports the display panel 2, and a sheet support part 42 which supports the optical sheet 3. The panel support part 41 is located at the back side of the peripheral edge part of the display panel 2, and supports the back surface of the peripheral edge part of the display panel 2 through the light shielding member 5. The optical sheet 3 is provided at an inside from the panel support part 41, and the panel support part 41 is located on an outside from the peripheral edge part of the optical sheet 3. The sheet support part 42 is a portion which protrudes from the panel support part 41 to a back side, and further protrudes to the inside. The sheet support part 42 is located at the back side of the peripheral edge part of the optical sheet 3, and supports the back surface of the peripheral edge part of the optical sheet 3.

Figure 4:
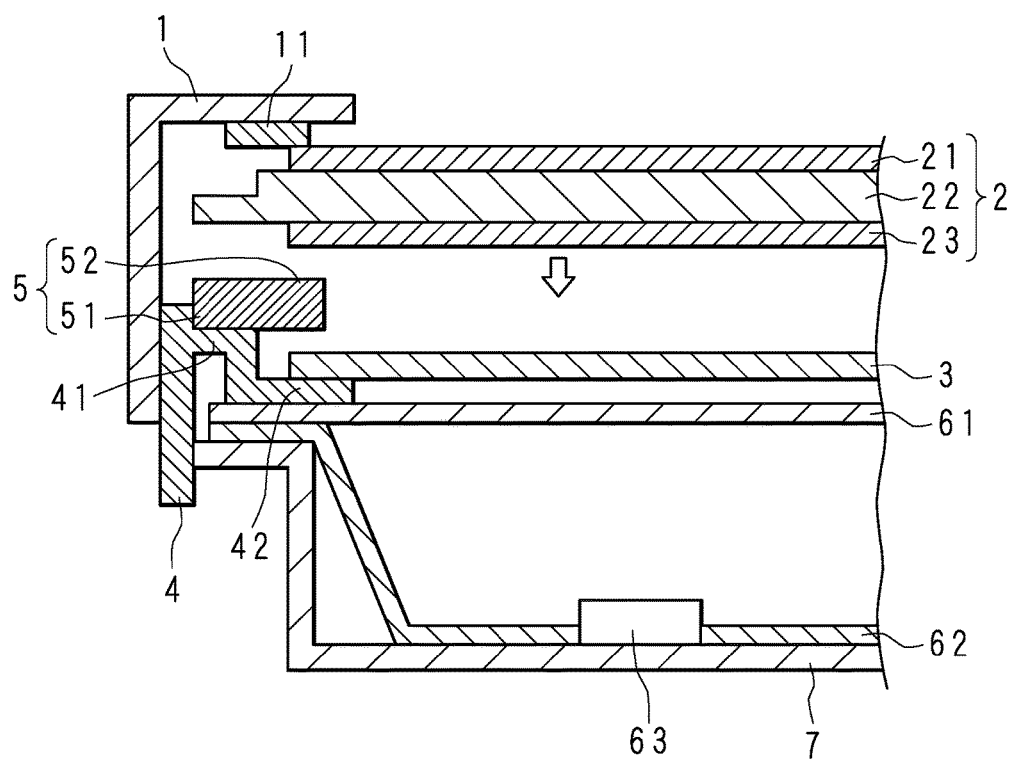
FIG. 4 is an explanatory view illustrating a state of assembling a light shielding member of the display apparatus according to Embodiment 1.

FIG. 4 is an explanatory view illustrating a state of assembling a light shielding member 5 of the display apparatus according to Embodiment 1, which illustrates a schematic partial cross-sectional view in which an end portion of the cross section of the display apparatus is enlarged. The light shielding member 5 is made of a material having elasticity such as silicone, urethane, rubber or the like. As illustrated in FIG. 4, the light shielding member 5 has a cross section formed in a rectangular shape. In the following description, a portion of the outside of the light shielding member 5, that is, a portion of a left side in FIG. 4 is referred to as an outer frame part 51. A portion of the inside of the light shielding member 5, that is, a portion of a right side in FIG. 4 is referred to as an inner frame part 52. The outer frame part 51 of the light shielding member 5 is in contact with the panel support part 41 of the inner chassis 4 from the front side. The inner frame part 52 protrudes to the inside from the panel support part 41. The outer frame part 51 of the light shielding member 5 is adhered to the inner chassis 4 by providing a double-sided adhesive tape, an adhesive, or the like at a portion contacting with the panel support part 41. By adhering the light shielding member 5 to the inner chassis 4, a positional shift of the light shielding member 5 during assembling is prevented. After the outer frame part 51 of the light shielding member 5 is adhered to the inner chassis 4, as illustrated in FIG. 4 by an arrow, the display panel 2 is laminated thereon from the front side. Further, the spacer 11 is laminated thereon, and the bezel 1 is fixed to the inner chassis 4. A state in which the bezel 1 is fixed becomes the state illustrated in FIG. 3.

As illustrated in FIG. 3, the light shielding member 5 is deformed in a stepped shape in which the outer frame part 51 and the inner frame part 52 are continued and the position of the inner frame part 52 shifts toward a back side from the position of the outer frame part 51. The outer frame part 51 of the light shielding member 5 is held between the peripheral edge part of the glass panel part 22 and the panel support part 41 of the inner chassis 4. The inner frame part 52 of the light shielding member 5 is in contact with the back surface of the polarizing plate 23 and the front surface of the optical sheet 3, and is held between the polarizing plate 23 and the optical sheet 3. That is, the light shielding member 5 is formed in a size so that the outer frame part 51 is in contact with the peripheral edge part of the glass panel part 22, and the inner frame part 52 is in contact with the polarizing plate 23 and the optical sheet 3. Since the polarizing plate 23 protrudes from the back surface of the peripheral edge part of the glass panel part 22, when the display panel 2 is laminated, the inner frame part 52 of the light shielding member 5 is pressed to the back side by the polarizing plate 23 to be deformed by as much as a thickness of the polarizing plate 23. In this way, the light shielding member 5 after laminating the display panel 2 is pressed in the front and back to become the stepped shape. Since the light shielding member 5 has elasticity, a restoring force is generated therein by being pressed, and the light shielding member 5 abuts so as to come into close contact with the back surface of the peripheral edge part of the glass panel part 22 which is exposed without being covered with the polarizing plate 23, the panel support part 41 of the inner chassis 4, the back surface of the peripheral edge part of the polarizing plate 23, and the front surface of the peripheral edge part of the optical sheet 3.

The light shielding member 5 is provided over an entire periphery of the display panel 2, and is formed in a frame shape in a front view. In addition, the light shielding member 5 is made of a material which blocks light. In order to increase light-shielding properties, it is preferable that a color of the light shielding member 5 is black. However, the color of the light shielding member 5 is not limited to the black, and may be other colors such as gray, white or the like. Since the light shielding member 5 is provided over the entire periphery of the display panel 2, the front surface of the peripheral edge part of the optical sheet 3 and the back surface of the peripheral edge part of the polarizing plate 23 are covered with the inner frame part 52 of the light shielding member 5. Therefore, light passing through the optical sheet 3 from the light sources 63 is shielded by the light shielding member 5 even when trying to be leaked to the outside from the polarizing plate 23, such that the light is not leaked. Substantially, all the light enters the polarizing plate 23 to contribute to image display on the display panel 2. Since the light is not leaked to the outside from the polarizing plate 23, the light does not enter an end face of the display panel 2, and the peripheral edge part of the glass panel part 22, and a light leakage does not occur. In addition, since the back surface of the peripheral edge part of the glass panel part 22 which is exposed without being covered with the polarizing plate 23 is in contact with the outer frame part 51 of the light shielding member 5, even if the light is leaked to the outside from the polarizing plate 23, the light is shielded by the outer frame part 51, such that the light does not enter the back surface of the peripheral edge part of the glass panel part 22, thus the light leakage does not occur. Further, even if the light is leaked to the outside from the optical sheet 3, similarly, the light is shielded by the outer frame part 51 of the light shielding member 5, thus the light leakage does not occur. Furthermore, even if the light is leaked to the outside from the diffusion plate 61 and the reflection sheet 62, the light is shielded by the inner chassis 4, thus the light leakage does not occur.

As described above, by providing the light shielding member 5, it is possible to prevent the light from entering the end face of the display panel 2, and the portion of the glass panel part 22 which is exposed without being covered with the polarizing plate 23, and reliably prevent an occurrence of light leakage, in which the peripheral edge portion of the display surface of the display apparatus becomes brighter than the other portions of the display surface. Even when the position of the light shielding member 5 is shifted along the display panel 2 due to variations in assembling, or the like, the state in which the glass panel part 22, the polarizing plate 23 and the optical sheet 3, and the light shielding member 5 come into close contact with each other may be easily maintained. Therefore, also in this case, the light is reliably shielded, and an occurrence of light leakage is prevented. Since the occurrence of light leakage is reliably prevented, a deterioration in quality of an image displayed by the display apparatus is prevented.

Embodiment 2

Figure 5:
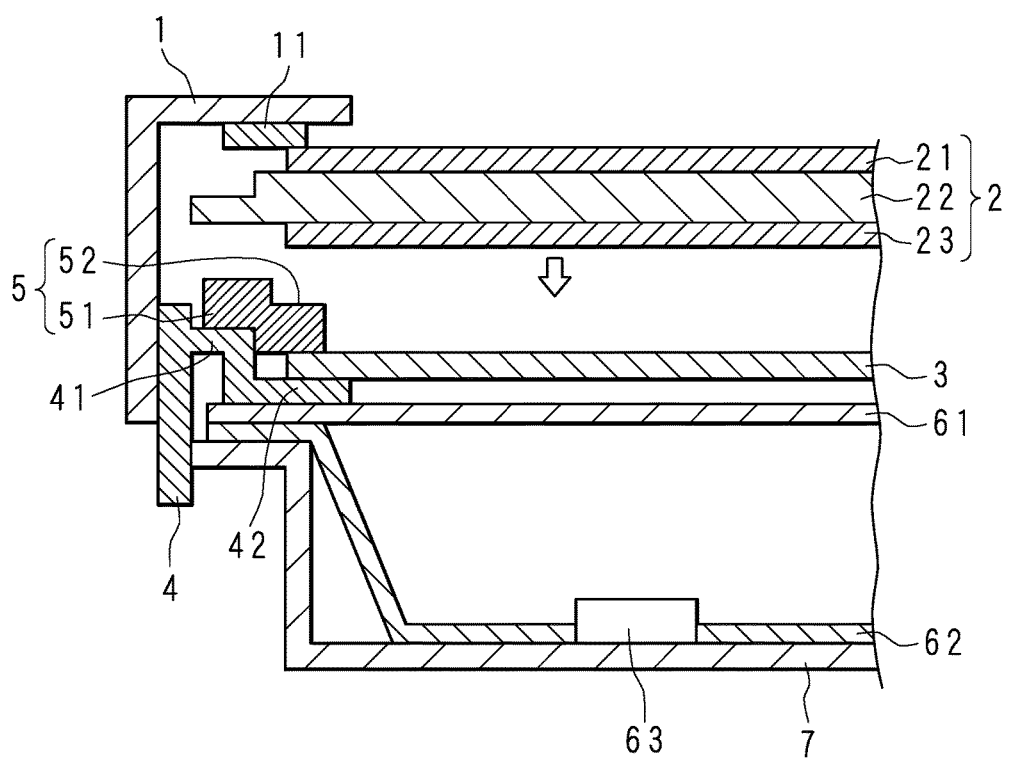
FIG. 5 is an explanatory view illustrating a state of assembling a light shielding member of a display apparatus according to Embodiment 2.

FIG. 5 is an explanatory view illustrating a state of assembling a light shielding member 5 of a display apparatus according to Embodiment 2, which illustrates a schematic partial cross-sectional view in which an end portion of the cross section of the display apparatus is enlarged. In Embodiment 2, a shape of the light shielding member 5 is different from that of Embodiment 1, but other components are the same as those of Embodiment 1. In Embodiment 2, the shape of the light shielding member 5 is close to the shape after assembling. As illustrated in FIG. 5, the light shielding member 5 has a cross section formed in a stepped shape. That is, the cross section of the light shielding member 5 becomes a shape in which an outer frame part 51 and an inner frame part 52, both of which have a rectangular cross section, are continued, and the position of the inner frame part 52 shifts toward a back side from the position of the outer frame part 51. The light shielding member 5 may be formed by processing two members having a rectangular cross section and bonding the same with each other. In addition, the light shielding member 5 may be a molded product which is molded so as to have a cross section formed in a stepped shape.

The outer frame part 51 of the light shielding member 5 is adhered to the panel support part 41 of the inner chassis 4 by a double-sided adhesive tape, an adhesive, or the like. When adhering the outer frame part 51, a left surface of the outer frame part 51 is separated from the inner chassis 4 by a gap. Similarly, a right surface of the outer frame part 51 is formed so as to open a gap with an end of the polarizing plate 23 of the display panel 2.

After the light shielding member 5 is adhered to the inner chassis 4, as illustrated in FIG. 5 by an arrow, the display panel 2 is laminated thereon. Further, the spacer 11 is laminated thereon, and the bezel 1 is fixed to the inner chassis 4. A state in which the bezel 1 is fixed becomes the state illustrated in FIG. 3. The light shielding member 5 is deformed during assembling to fill the gap. Further, the configuration of opening the gap is not indispensable, and the configuration of the display apparatus may be a configuration without opening the gap.

Also in the present embodiment, the display apparatus obtains the same effects as those of Embodiment 1. That is, an occurrence of light leakage is reliably prevented, thus a deterioration in quality of an image displayed by the display apparatus is prevented. In addition, in the present embodiment, a cross-sectional shape of the light shielding member 5 is formed in a stepped shape so as to substantially coincide with a cross-sectional shape which is formed by being held by the display panel 2, the inner chassis 4 and the optical sheet 3. Therefore, the light shielding member 5 has a high adhesiveness with the display panel 2, the inner chassis 4 and the optical sheet 3. When a vibration occurs in a direction along the display panel 2, the outer frame part 51 is locked to the polarizing plate 23, and the inner frame part 52 is locked to the panel support part 41 of the inner chassis 4, such that a position of the light shielding member 5 in a vibration direction is prevented from being shifted. Therefore, the display apparatus may reliably prevent an occurrence of light leakage.

In the above Embodiments 1 and 2, the light shielding member 5 is adhered to the inner chassis 4, but it is not limited thereto. For example, the light shielding member 5 may be adhered to the peripheral edge part of the display panel 2. Also in this case, a positional shift of the light shielding member 5 during assembling the display apparatus is prevented. In addition, the display apparatus may also be assembled without performing adhesion.

Embodiment 3

Figure 6:
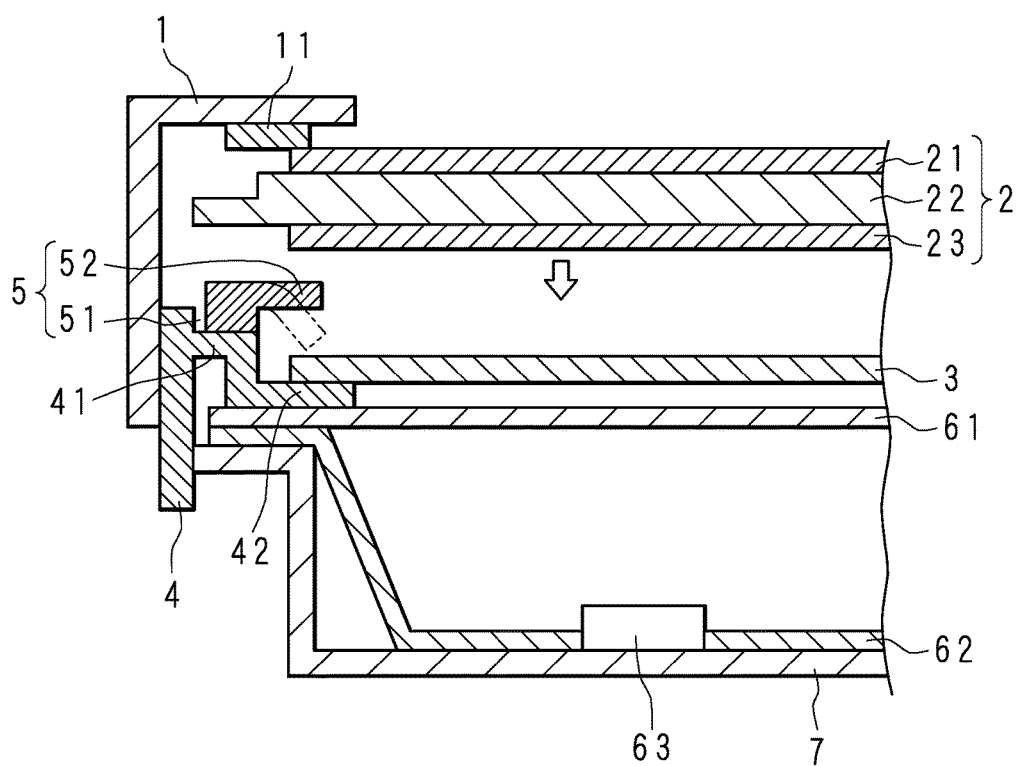
FIG. 6 is an explanatory view illustrating a state of assembling a light shielding member of a display apparatus according to Embodiment 3.

FIG. 6 is an explanatory view illustrating a state of assembling a light shielding member 5 of a display apparatus according to Embodiment 3, which illustrates a schematic partial cross-sectional view in which an end portion of the cross section of the display apparatus is enlarged. In Embodiment 3, a shape of the light shielding member 5 is different from that of Embodiments 1 and 2, but other components are the same as those of Embodiments 1 and 2. In Embodiment 3, an outer frame part 51 and an inner frame part 52 of the light shielding member 5 has a cross section formed in a rectangular shape, respectively, and the inner frame part 52 is thinner than the outer frame part 51. FIG. 6 illustrates an example, in which a surface of the outer frame part 51 and a surface of the inner frame part 52 on the front side thereof are in a same plane, but the surfaces of the outer frame part 51 and the inner frame part 52 on the front side thereof may not be in a same plane, so far as they have a shape in which thickness of the inner frame part 52 is thinner than the outer frame part 51.

The outer frame part 51 of the light shielding member 5 is adhered to the panel support part 41 of the inner chassis 4 by a double-sided adhesive tape, an adhesive, or the like.

When adhering the outer frame part 51, similar to the case of Embodiment 2, a left surface of the outer frame part 51 is separated from the inner chassis 4 by a gap. The light shielding member 5 is deformed during assembling to fill the gap. Further, the configuration of opening the gap is not indispensable, and the configuration of the display apparatus may be a configuration without opening the gap.

An assembling sequence in the present embodiment will be described. The reflection sheet 62 and the light sources 63 are assembled in the backlight chassis 7, and then the diffusion plate 61 is assembled. Next, the inner chassis 4 to which the light shielding member 5 is previously adhered is assembled, or after assembling the inner chassis 4, the light shielding member 5 is adhered thereto. Thereafter, the optical sheet 3 is disposed. When disposing the optical sheet 3, the inner frame part 52 of the light shielding member 5 is disturbed. However, since the light shielding member 5 has elasticity, and the inner frame part 52 is thinner than the outer frame part, by pushing the optical sheet 3 from the front side, as illustrated in FIG. 6 by a dashed-two dotted line, the inner frame part 52 is pressed by the peripheral edge part of the optical sheet 3 to be bent. By letting the inner frame part 52 of the light shielding member 5 be bent, the optical sheet 3 moves to the back side of the inner frame part 52, and is disposed at a position supported by the sheet support part 42 of the inner chassis 4 from behind. After the optical sheet 3 is disposed, the inner frame part 52 of the light shielding member 5 returns to an original shape by the restoring force thereof. Next, the display panel 2 is laminated thereon, the spacer 11 is disposed thereto, and the bezel 1 is fixed to the inner chassis 4. A state in which the bezel 1 is fixed becomes the state illustrated in FIG. 3. It is possible to prevent the inner frame part 52 of the light shielding member 5 from being inserted to the back side of the optical sheet 3.

Also in the present embodiment, the display apparatus obtains the same effects as those of Embodiment 1. That is, an occurrence of light leakage is reliably prevented, thus a deterioration in quality of an image displayed by the display apparatus is prevented. In addition, even when the light shielding member 5 is previously adhered to the inner chassis 4, the inner frame part 52 of the light shielding member 5 is prevented from being inserted to the back side of the optical sheet 3, such that workability of assembling work is improved. In addition, by previously adhering the light shielding member 5 to the inner chassis 4, it is possible to prevent the position of the light shielding member 5 from being shifted during assembling.

Technical characteristics (configuration requirements) described in each embodiment may be combined with each other, and new technical characteristics may be formed by combining the same. It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus, comprising:
   a display panel having a front surface displaying an image and a rear surface opposite to the front surface;
   a light source for emitting light toward the rear surface of the display panel;
   an optical sheet having a front surface facing the rear surface of the display panel and a rear surface opposite to the front surface;
   a frame-shaped support body supporting the display panel and the optical sheet; and
   a frame-shaped light shielding member in contact with a periphery of the rear surface of the display panel,
   wherein the support body includes:
   a panel support part having a front surface facing a first region of the periphery of the rear surface of the display panel and supporting the display panel through the light shielding member which is contact with the front surface; and
   a sheet support part having a front surface in contact with a periphery of the rear surface of the optical sheet,
   the light shielding member includes:
   an outer frame part having (i) a front surface in contact with the first region of the periphery of the rear surface of the display panel and (ii) rear surface in contact with the front surface of the panel support part; and
   an inner frame part including an outer edge continuous with an inner edge of the outer frame part, the inner frame part having (i) a front surface which is in contact with a second region of the periphery of the rear surface of the display panel which is inside the first region and (ii) a rear surface which faces the front surface of the optical sheet and is not in contact with the front surface of the panel support part,
   the outer frame part of the light shielding member is held between the periphery of the display panel and the panel support part of the support body, and
   the periphery of the optical sheet is between the inner frame part of the light shielding member and the sheet support part of the support body.

2. The display apparatus according to claim 1, wherein the display panel includes (i) a glass panel part, and (ii) a first polarizing plate and a second polarizing plate affixed respectively to a front surface and a rear surface of the glass panel part,
   the rear surface of the glass panel part has (i) a central region to which the second polarizing plate is attached, and (ii) a peripheral region surrounding the central region and not having the second polarizing plate attached thereto,
   the peripheral region of the rear surface of the glass panel part is the first region of the periphery of the rear surface of the display panel, and
   the periphery of the second polarizing plate is the second region of the periphery of the rear surface of the display panel.

3. The display apparatus according to claim 2, wherein the light shielding member has a stepped shape in which the front surface of the outer frame part is closer to the display panel than the front surface of the inner frame part.

4. The display apparatus according to claim 1, wherein the light shielding member has elasticity.

5. The display apparatus according to claim 1, wherein in the light shielding member, the front surface of the outer frame part is adhered to the rear surface of the display panel, and/or the rear surface of the outer frame part is adhered to the front surface of the support body.

6. The display apparatus according to claim 4, wherein, in the light shielding member, the thickness of the inner frame part is thinner than that of the outer frame part.

7. The display apparatus according to claim 1, wherein
the panel support part of the support body is closer to the display panel than the optical sheet, and
the sheet support part of the support body is closer to the light source than the optical sheet.

8. The display apparatus according to claim 1, wherein
the rear surface of the inner frame is in contact with the front surface of the optical sheet.

* * * * *